R. H. & W. H. COON.
THRASHING MACHINE.
No. 10,251. Reissued Dec. 5, 1882.
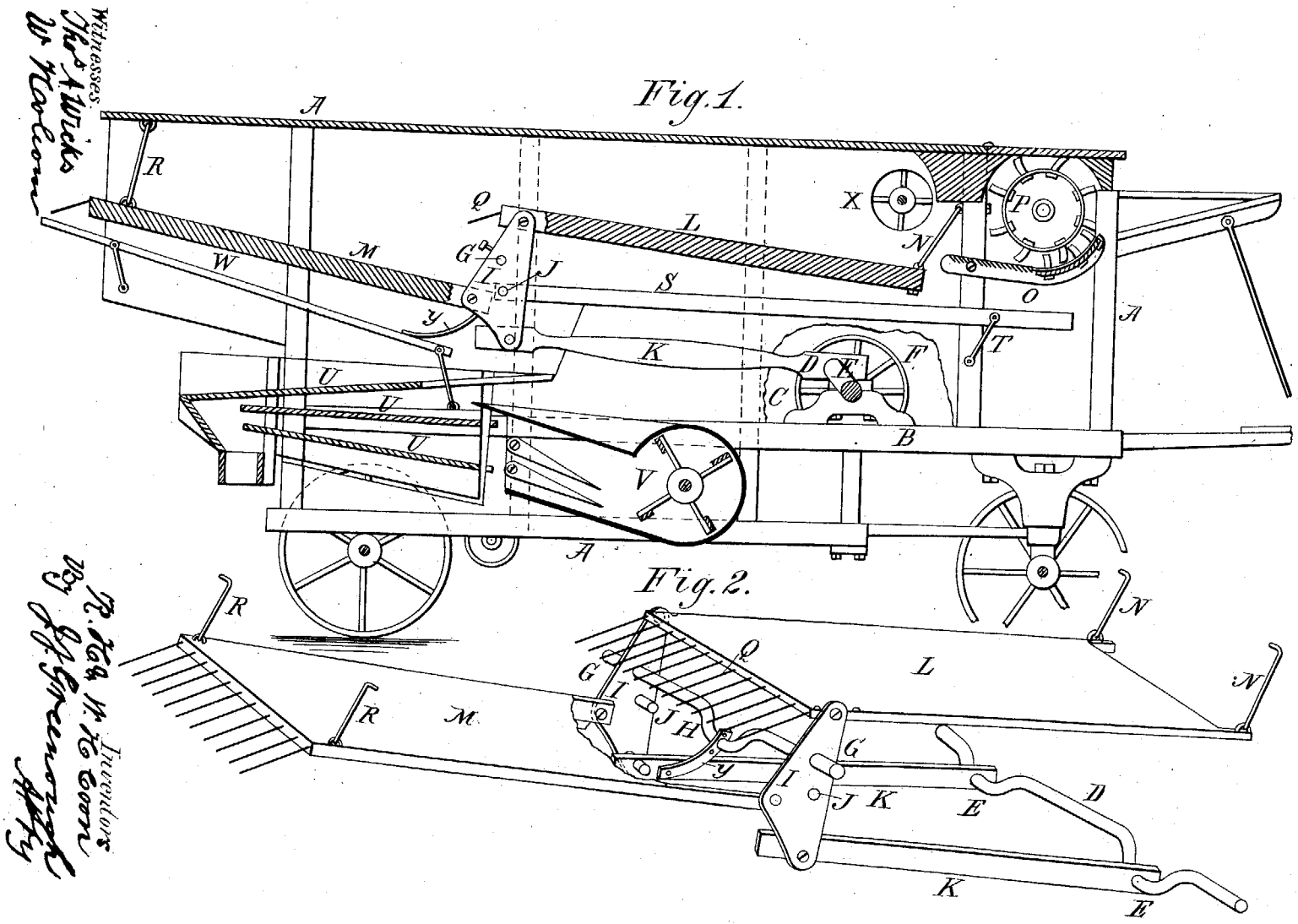
Witnesses:
Thos A Wicks
W Holcom
Inventors
R. H. & W. H. Coon
By J. J. Greenough
Atty
N. PETERS, Photo-Lithographer, Washington, D. C.

UNITED STATES PATENT OFFICE.

RILEY H. COON AND WILLIAM H. COON, OF ONEIDA LAKE, NEW YORK.

THRASHING-MACHINE.

SPECIFICATION forming part of Reissued Letters Patent No. 10,251, dated December 5, 1882.

Original No. 245,791, dated August 16, 1881. Application for reissue filed March 20, 1882.

*To all whom it may concern:*

Be it known that we, RILEY H. COON and WILLIAM H. COON, residing at Oneida Lake, Madison county, and State of New York, have invented certain new and useful Improvements in Thrashing-Machines, of which the following is a description.

The purpose of our invention is to so apportion and balance the vibrating parts of our machine as to counteract all strains upon the stationary parts, hold the machine steady, and reduce the driving-power required to a minimum by thus properly balancing the moving parts.

The construction is as follows, referring to the accompanying drawings, in which—

Figure 1 is a vertical longitudinal section through the center of the machine. Fig. 2 is a perspective view of the separator or straw-carrier and its movable connections.

Similar letters represent corresponding parts in both figures.

A represents the inclosing case or frame of the machine, of a common form.

B is a stout sill of the frame, sustaining the boxes or bearings of the shaft D, which has two sunk cranks, E, in it inside the frame and near its bearings. Upon one end of the shaft D, outside the frame, there is a pulley, F, affixed and driven by a band from the motive power.

G is a shaft extending across the machine, with bearings in the side frame, located in rear of and above the shaft D. Shaft G has a sunk crank, H, at its center, and near each of its bearings a triangular plate or lever, I I, is affixed firmly, so as to turn with it. These plates I I are vibrated by pitmen K, uniting their lower ends with the cranks E.

The separator or straw-carrier is made in two parts or sections, L M. The front section L, is suspended at its front end from the frame, just below the rear end of the concave *o*, by rods or hangers N, and receives the straw and grain after passing the thrashing-cylinder P. The rear end of section L is pivoted to the upper end of the levers I I, by which it receives a peculiar vibratory motion, best suited to carry the straw and separate the grain therefrom by giving it an upward and rearward throw. The grain drops down onto a grain-table, S, below section L. This table S is supported at its front end on the upper ends of links or rods T, which are pivoted to the frame at their lower ends, and its rear end is pivoted by wrist-pins J on levers I, just below and in front of the shaft G, as clearly shown in Fig. 1, which gives it a short upward and rearward throw that carries the grain, chaff, &c., back to the riddles U. Upon the rear edge of section L there is a series of fingers, Q, inclining downward over section M of the straw-carrier, to guide the straw as it drops upon said section rearward. The section M has a movement opposite to that of section L, which is thereby counterbalanced, its front end being pivoted to the levers I below shaft G. The rear end of this section M is suspended on links or hanger-rods R, pivoted to the frame above. This section has also inclined fingers at its rear end, where the straw is discharged from the machine. There is a grain-table, W, below section M. This table W is supported on the upper ends of links or rods at both its ends, as clearly seen in the drawings, and receives a shaking movement from a pitman, Y, that connects it with sunk crank H on shaft G, before named.

By dividing the straw-carrier and connecting its sections L M at the center with the vibrating plates I, while their outer ends are supported by links attached to the frame, plates I receive the force of their counteracting movements, which are thereby neutralized, and the grain-carriers, being connected with the central shaft, G, and plates I, also serve to counterbalance the vibrating parts, so as to prevent all shocks and strains upon the frame and driving-shaft D.

Having thus described our machine, we claim—

1. In a thrashing-machine, the combination of straw-shakers L M, arranged in succession, levers I I, connecting the adjacent ends of said shakers, pivoted supports for said levers between said shakers, pitmen K, and crank-shaft E, constructed and arranged substantially as and for the purposes specified.

2. In a thrashing-machine, the combination of the crank-shaft G, levers I I, the carrier-sections L M, and grain-table W, as and for the purposes specified.

3. The combination of the double-crank shaft D, crank-shaft G, and triangular plates I I, separators L M, grain-conveyers S W, and pit-men or connecting-rods K K Y, all arranged and operating substantially as and for the purposes herein shown and specified.

In testimony whereof we have hereto affixed our signatures in presence of two witnesses.

RILEY H. COON,
WILLIAM H. COON.

Witnesses:
CHARLES L. HOBART,
JOHN E. STIMSON.